US009317282B2

(12) United States Patent  
Mun et al.

(10) Patent No.: US 9,317,282 B2  
(45) Date of Patent: Apr. 19, 2016

(54) SERVER PROVIDING CLOUD SERVICE, TERMINAL FOR DEVELOPER AND METHOD FOR SUPPORTING APPLICATION DEVELOPMENT USING THE SAME

(71) Applicant: SAMSUNG ELECTRONICS CO., LTD., Suwon-si, Gyeonggi-do (KR)

(72) Inventors: Kyoung-ran Mun, Suwon-si (KR); Tamrakar Nipun Ram, Suwon-si (KR); Jong-seon Kim, Yongin-si (KR); Kyoung-su Lee, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/518,006

(22) Filed: Oct. 20, 2014

(65) Prior Publication Data

US 2015/0135163 A1  May 14, 2015

(30) Foreign Application Priority Data

Nov. 12, 2013  (KR) .................. 10-2013-0136996

(51) Int. Cl.
*G06F 9/44* (2006.01)
*G06F 9/445* (2006.01)

(52) U.S. Cl.
CPC ...... *G06F 8/71* (2013.01); *G06F 8/63* (2013.01)

(58) Field of Classification Search
CPC ............................................................ G06F 8/71
USPC .................................. 717/106, 120–135
See application file for complete search history.

(56) References Cited

U.S. PATENT DOCUMENTS

| 9,003,406 | B1* | 4/2015 | Hodge et al. ................ 718/1 |
| 2004/0032429 | A1* | 2/2004 | Shah ................ G06F 8/34 715/771 |
| 2012/0311564 | A1* | 12/2012 | Khalid ................ 718/1 |
| 2013/0066940 | A1 | 3/2013 | Shao |
| 2013/0167111 | A1* | 6/2013 | Moore et al. ............ 717/105 |
| 2013/0239089 | A1* | 9/2013 | Eksten ................ G06F 8/70 717/120 |
| 2013/0263080 | A1* | 10/2013 | Karnik et al. ........... 717/104 |
| 2013/0268913 | A1* | 10/2013 | Anderson et al. ....... 717/120 |
| 2015/0242204 | A1* | 8/2015 | Hassine ................ G06F 8/61 717/121 |

OTHER PUBLICATIONS

Hartmann, Gustavo, Geoff Stead, and Asi DeGani. "Cross-platform mobile development." Mobile Learning Environment, Cambridge (2011), pp. 1-18.*

(Continued)

*Primary Examiner* — Satish Rampuria
(74) *Attorney, Agent, or Firm* — Staas & Halsey LLP

(57) ABSTRACT

Disclosed are a server providing a cloud service, a terminal for a developer and a method for supporting application development using the same, the method of supporting application development using a cloud service. The method including: accessing an integrated system providing a cloud service; selecting a developing environment corresponding to a development-target application through a template provided by the integrated system; creating an application based on the developing environment; and verifying the created application using an object image provided by the integrated system and rendered with regard to at least one device where an application is to be driven. Thus, the developer can easily construct the application developing environment without purchase and complicated installation procedures for constructing the integrated environment.

22 Claims, 7 Drawing Sheets

(56) References Cited

OTHER PUBLICATIONS

Heitkötter, Henning, Sebastian Hanschke, and Tim A. Majchrzak. "Evaluating cross-platform development approaches for mobile applications." Web information systems and technologies. Springer Berlin Heidelberg, 2013, pp. 120-138.*

Holzinger, Andreas, Peter Treitler, and Wolfgang Slany. "Making apps useable on multiple different mobile platforms: On interoperability for business application development on smartphones." Multidisciplinary research and practice for information systems. Springer Berlin Heidelberg, 2012, pp. 176-189.*

* cited by examiner

SERVER PROVIDING CLOUD SERVICE, TERMINAL FOR DEVELOPER AND METHOD FOR SUPPORTING APPLICATION DEVELOPMENT USING THE SAME

CROSS-REFERENCE TO RELATED APPLICATIONS

This application claims priority from Korean Patent Application No. 10-2013-0136996, filed on Nov. 12, 2013 in the Korean Intellectual Property Office, the disclosure of which is incorporated herein by reference.

BACKGROUND

1. Field

Apparatuses and methods consistent with the exemplary embodiments relate to a server providing a cloud service, a terminal for a developer and a method for supporting application development using the same and, more particularly, to an apparatus and method for providing a cloud service to develop an application for smart devices.

2. Description of the Related Art

A smart device, such as a smart phone, a smart television (TV), etc., has no limit as to its function and, thus, the function may, for example, be changed or extended or upgraded through installation of various applications.

An application for a smart device is generally developed and published by a developer, and to this end the developer has to construct an environment for developing an application by manually installing a software development kit (SDK), an editor, an emulator and a compiler to a developer personal computer (PC).

However, such a procedure for constructing the environment is complicated and is likely to make an error, and therefore an unskilled developer may give up developing the application. Also, the developer may shirk from developing the application of a specific platform since it is cumbersome to upload the application to a market in order to publish the application.

Typically, the developed application needs to be verified for testing compatibility with a smart device before publication. To this end, a manufacturer of a smart device, a radio officer, a market manager, an application distributor, etc. are outfitted with verification teams according to device types. The verification team repetitively performs the verification according to smart devices and firmware with regard to the application. As the verification is performed under various conditions in order to secure stability, not only it takes more time but also an opportunity cost incurs between application market expansion of the smart device and a verification cost.

SUMMARY

Additional aspects and/or advantages will be set forth in part in the description which follows and, in part, will be apparent from the description, or may be learned by practice of the embodiments.

According to an aspect of an exemplary embodiment, a method of supporting application development using a cloud service, the method including: accessing an integrated system providing a cloud service; selecting a developing environment corresponding to a development-target application through a template provided by the integrated system; creating an application based on the developing environment; and verifying the created application through an object image provided by the integrated system and rendered with regard to at least one device where an application is driven is provided.

The selecting the developing environment may includes: loading a plurality of templates previously stored corresponding to types of the developing environment for the application; and selecting one among the plurality of loaded templates.

The selecting the developing environment may include selecting a software development kit (SDK), an editor, a compiler and an operating system (OS) platform with regard to the development-target application.

The verifying the application may includes: constructing a driving environment, in which the created application operates, through the object image; and verifying the application under the constructed driving environment.

The constructing the driving environment may include: selecting one among a plurality of object images rendered and previously stored corresponding to a driving environment of an application; and loading a container with the selected object image.

The plurality of objects may be rendered corresponding to each of a plurality of types of the device and previously stored as the plurality of object images which are virtualized.

The constructing the driving environment may includes: selecting one among the plurality of software development kits compatible with the device; and loading the container with the selected software development kit.

The software development kit may be provided as a plug-in of the integrated system.

The method may further include transmitting a result of the verification to a verifier.

The method may further include uploading and publishing the created application with a market in accordance with results of the verification.

The method may further include providing an operating system, which manages the registered application in the form of a template.

The method may further include re-verifying the application through the rendered object image in accordance with results of the verification.

According to an aspect of another exemplary embodiment, a server for providing a cloud service, which a terminal for a developer of an application accesses is provided including a template provider configured to provide a plurality of templates corresponding to a developing environment for a development-target application so that the terminal for the developer can select the template; and a renderer configured to verify an application created based on the developing environment corresponding to the template selected among the plurality of templates, through an object image rendered with regard to at least one device where the application is driven, the template provider and the renderer being included in the integrated system of the server for providing the cloud service.

The template provider may load the plurality of templates previously stored corresponding to types of developing environment for an application, and receive selection of the terminal for the developer about one among the plurality of loaded templates.

The server may further include a developing environment setter configured to provide a software development kit (SDK), an editor, a compiler and an operating system (OS) platform to be selected with regard to the development-target application.

The renderer may construct a driving environment, in which the created application operates, through the object image, and verify the application under the constructed driving environment.

The renderer may load a container with one object image selected among the plurality of object images rendered and previously stored corresponding to a driving environment for an application.

The plurality of objects may be rendered corresponding to each of a plurality of types of the device and previously stored as the plurality of object images which are virtualized.

The renderer may further load the container with one software development kit selected among the plurality of software development kits compatible with the device The software development kit may be provided as a plug-in of the integrated system.

A result of the verification may be transmitted to a terminal of verifier connected to the server for providing the cloud service.

The server may further include a market manager configured to upload and publish the created application with a market in accordance with results of the verification.

The server may further include an application manager configured to provide an operating system, which manages the registered application, in the form of a template.

The renderer may re-verify the application through the rendered object image in accordance with results of the verification.

According to an aspect of another exemplary embodiment, a terminal for a developer, which accesses a server for providing a cloud service, the terminal including: a display configured to display a plurality of templates corresponding to a developing environment of a development-target application and display an object image rendered with regard to at least one device where an application is driven so that the template and the object image received from the server for providing the cloud service can be selected; and a user input section configured to select a developing environment for an application by selecting one among the plurality of displayed templates, and select a driving environment of an application by selecting one among the displayed object images, and the selected developing environment and driving environment information being transmitted to the server for providing the cloud service is provided.

The user input section may select a software development kit (SDK), an editor, a compiler and an operating system (OS) platform with regard to the development-target application.

The user input section may further select one among the plurality of software development kits compatible with the device; and select the driving environment of the application.

The display may further display an operating system, which manages the application registered to the server for providing the cloud service, in the form of a template.

According to an aspect of an exemplary embodiment a smart device application development method, may include selecting a developing environment using a template provided by an integrated system of a cloud service; creating an application of a smart device using the developing environment; and rendering an object image using the application with respect to the device where the application is to be driven to verify the application.

According to an aspect of an exemplary embodiment a method may include creating an application for a target smart device; rendering an object image using the application with respect to the target smart device where the application is to be driven; and visually verifying the application using the object image, so that the rendering the object image facilitates verification. The method may further include allowing a developer of the application to select a development environment from development environment templates corresponding to types of development environments, where the templates are available in an integrated system provided by a cloud server. The method may further include constructing a driving environment for the application where the application is to be driven where the rendering constructs the driving environment with the object image, installs a software development kit compatible with the device and the application in a driving environment container and executes the application to verify functional operation. The method may further include publishing the application.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Figure 1:
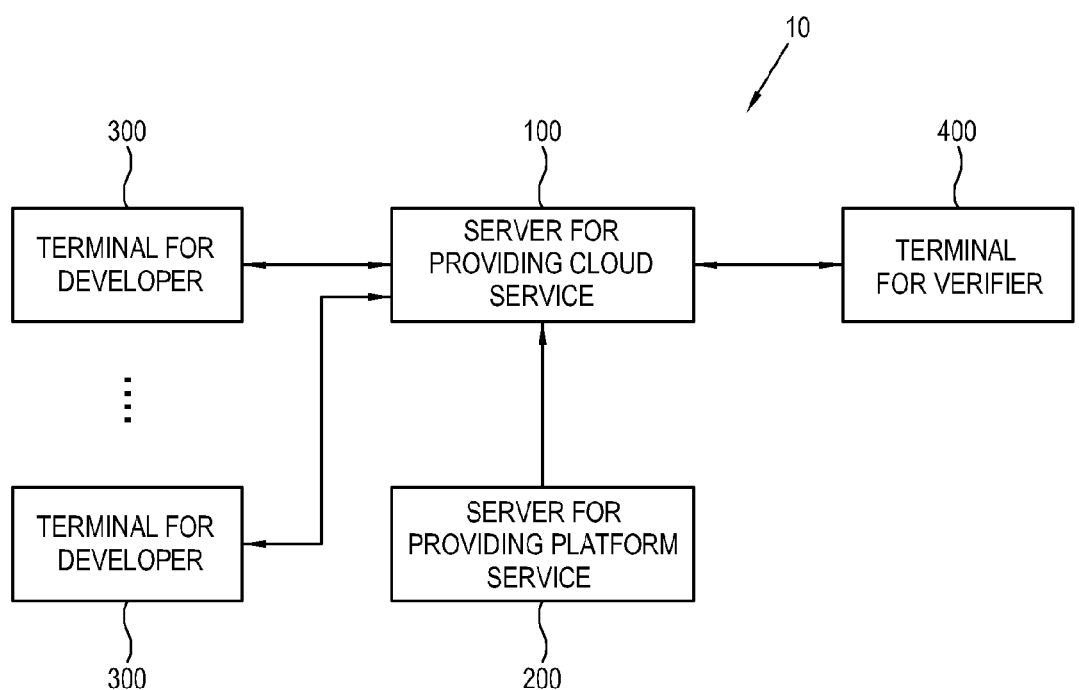
FIG. 1 is a block diagram showing a cloud integrated system according to an exemplary embodiment.

Reference will now be made in detail to the embodiments, examples of which are illustrated in the accompanying drawings, wherein like reference numerals refer to the like elements throughout. The embodiments are described below to explain the embodiments by referring to the figures.

Below, exemplary embodiments will be described in detail with reference to accompanying drawings.

FIG. 1 is a block diagram showing a cloud integrated system according to an exemplary embodiment.

As shown in FIG. 1, a cloud system 10 according to an exemplary embodiment includes a server 100 for providing a cloud service 100, a server 200 for providing a platform service, a terminal 300 for a developer, and a terminal 400 for a verifier.

The terminal 300 for the developer and the terminal 400 for a verifier are achieved by a personal computer (PC), and connected to the server 100 for providing the cloud service (hereinafter, referred to as a "cloud server") via a wired or wireless network.

The developer uses the terminal 300 for the developer to access the server 100 for providing the cloud service, and develops and primarily verifies an application (hereinafter, referred to as "App") with regard to a predetermined smart device. According to an exemplary embodiment, the application includes various application software executable in the smart device without limit of its function. The terminal 300 for the developer may include a display (not shown) which displays a screen received from an integrated system of a cloud server 100, and a user input section (not shown) which receives selections corresponding to the screen displayed on the display.

The verifier (a person) uses the terminal 400 for the verifier to access the server 100 for providing the cloud service and secondarily verifies the application of which development and verification are completed by the developer. The verifier finally approves the application developed by the developer and uploads the application for publication. The verifier may be employed by a manufacturer of a smart device, a radio officer, a market manager, an application distributor, etc.

In this exemplary embodiment, the cloud server 100 uses the cloud service to support the development of the application, and provides a cloud integrated system (hereinafter, referred to as an "integrated system"), in which an integrated environment for developing the application is constructed, to a developer of an application for the smart device. The cloud server 100 provides the cloud service based on the integrated system to the terminal 300 for the developer and the terminal 400 for the verifier. The cloud service is to provide functions related to information technology (IT) in the form of a service, which can be classified into an Infrastructure as a service (IaaS), a platform as a service (PaaS), software as a service (SaaS), etc. in accordance with given service ranges. The IaaS refers to the infrastructure as a service, which may for example include Amazon AWS (Amazon Web Services). The PaaS refers to the platform as a service. The SaaS refers to the software as a service, which may for example include Google Apps. In this exemplary embodiment, the cloud service includes all the IaaS, the PaaS and the SaaS. Below, the platform based on the PaaS will be provided as a service by way of example.

The developer accesses the cloud server 100 through a wired and wireless communication network, and develops and verifies an application to be driven in a predetermined smart device. Here, the smart device includes various electronic apparatuses, such as a smart phone, a tablet PC, a smart TV or the like, functions of which can be extended by the application.

The cloud server 100 may be managed by a manufacturer of a smart device, a radio officer, a market manager, an application distributor, etc.

The server 200 for providing a platform service (hereinafter, referred to as a "platform server") provides a plurality of templates corresponding to the application development environment and a plurality of object images rendered for the device in which the application is to be driven, to the cloud server 100. The platform server 200 may be operated by a manufacturer of a smart device, a radio officer, a market manager, an application distributor, etc.

The cloud server 100 uses the developing environment template and the rendering object image provided by the platform server 200, and provides a cloud type integrated system to the terminal 300 for the developer. The display (not shown) of the terminal 300 for the developer displays a user interface screen provided by the cloud integrated system, thereby offering a convenience in developing an application to the developer. Thus, in this exemplary embodiment, the developer does not have to directly install a software development kit (SDK), editor, emulator, compiler, etc. in his/her own terminal 300, and receives the environments for developing the application by just accessing the cloud server 100.

Meanwhile, the foregoing embodiment shown in FIG. 1 illustrates a separate server for providing a platform service 200, but not limited thereto. Alternatively, a manager of the cloud server 100 may directly construct the integrated system to the cloud server 100. That is, an exemplary embodiment may include both the case where the cloud server 100 and the platform server 200 are respectively operated by separate managers and the case where they are operated by one manager.

Figure 2:
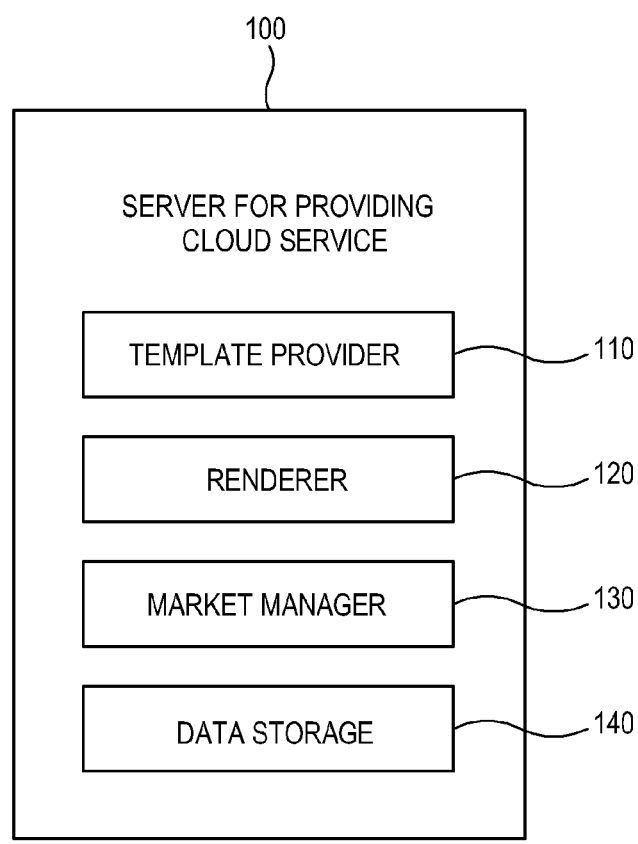
FIG. 2 is a block diagram schematically showing a server for providing a cloud service shown in FIG. 1.
Figure 3:
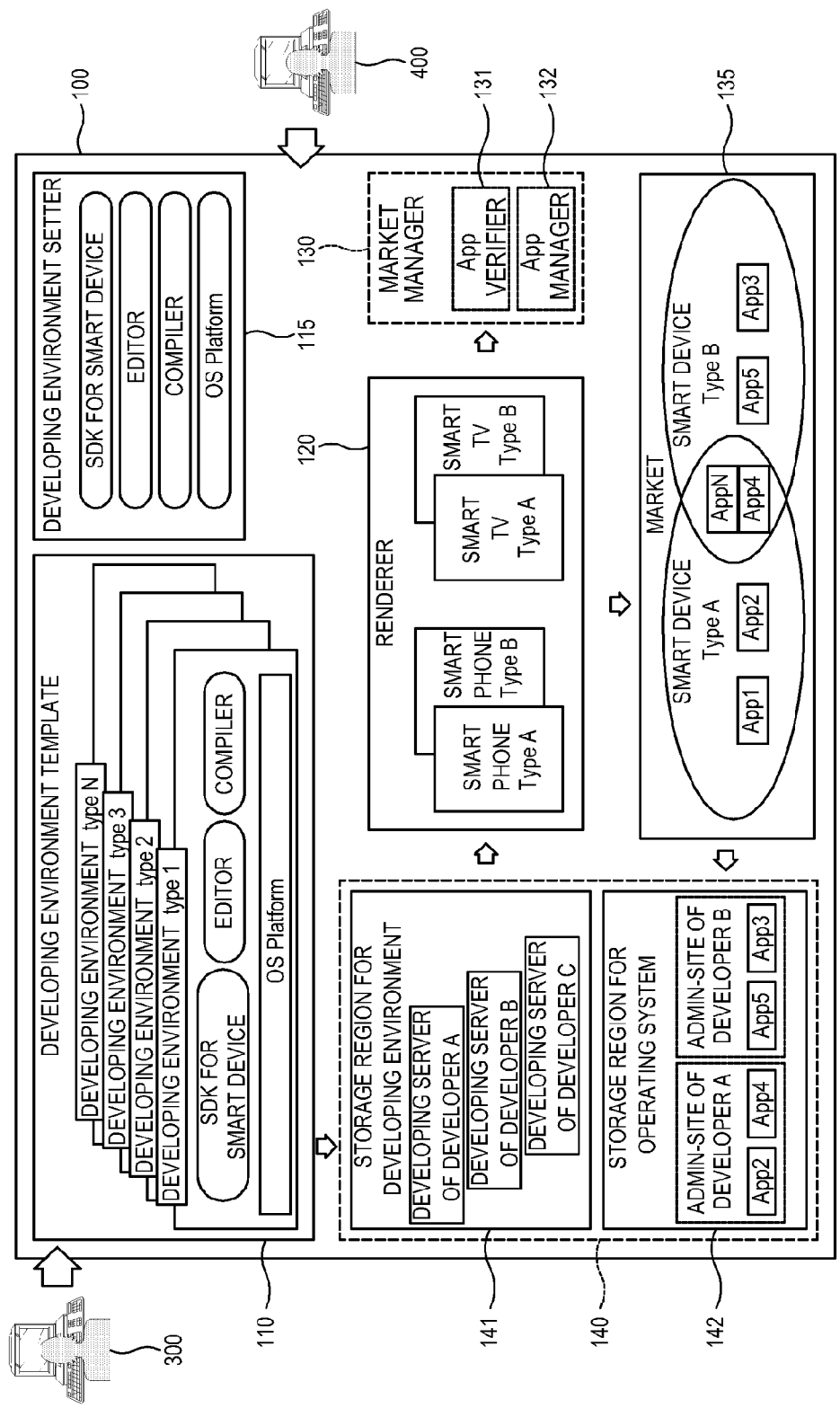
FIG. 3 is a view for explaining operations of a server for providing a cloud service in FIG. 1.
Figure 4:
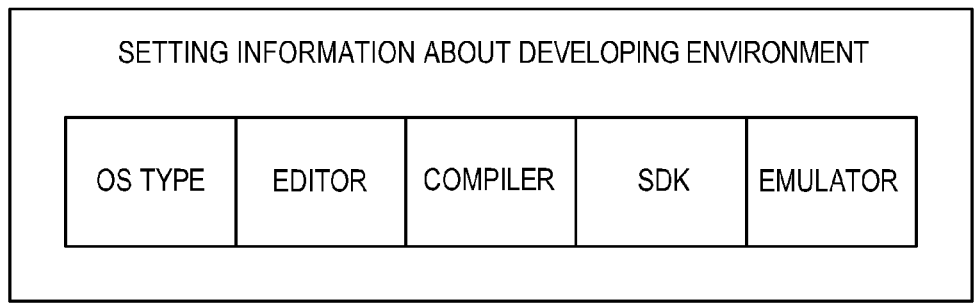
FIG. 4 is a view showing an example of setting information for constructing a developing environment.

FIG. 2 is a block diagram schematically showing a server for providing a cloud service shown in FIG. 1; FIG. 3 is a view for explaining operations of a server for providing a cloud service in FIG. 1; and FIG. 4 is a view showing an example of setting information for constructing a developing environment.

As shown in FIG. 2, the cloud server 100 includes a template provider 110, a renderer 120, a market manager 130 and a data storage 140.

The template provider 110 loads a plurality of templates where the developing environment is constructed corresponding to a development-target application, and provides the plurality of loaded templates to the terminal 300 for the developer. The plurality of loaded templates is displayed on the display of the terminal 300 for the developer so as to be selected by the developer.

Here, the developing environment templates are previously stored corresponding to various developing environment types. As shown in FIG. 3, the developing environment templates may be previously determined in accordance with an OS platform, a SDK for a smart device, SDK, an editor and a compiler and stored in the data storage 140.

Specifically, the developing environment template may be constructed based on the setting information for the developing environment shown in FIG. 4. That is, the template provider 110 provides the developer with the templates corresponding to various combinations of the setting information shown in FIG. 4, so that the developer can construct the developing environment by simply selecting one among the plurality of templates displayed on the terminal 300.

Meanwhile, the cloud server 100 in this exemplary embodiment may further include a developing environment setter 115 as shown in FIG. 3. The developing environment setter 115 provides a user interface through the display of the terminal 300 for the developer so that the developer can directly set up the developing environment. If the developer wants to construct a separate environment in addition to the developing environment provided by the template provider 110, s/he can construct his/her unique developing environment by selecting an SDK for a smart device, an editor, a compiler and an OS platform with respect to a development-target application displayed on the terminal 300 for the developer. Accordingly, it is possible for the developer to construct various developing environments in accordance with his/her preferences.

Such a selected developing environment is sorted in accordance with the plurality of developers and stored in the data storage 140. For example, as shown in FIG. 3, the data storage 140 may include a developing environment storage region 141 in which a plurality of developing servers constructed corresponding to a plurality of developers A, B and C are stored.

As described above, when the selection of the developing environment corresponding to the development-target application is completed, the developer controls the user input section (not shown) of the terminal 300 for the developer to develop the application and therefore the application is generated.

The renderer 120 verifies a created application through an object image rendered with regard to at least one device (i.e., a smart device) where an application is driven. Here, as shown in FIG. 4, a plurality of objects rendered according to a plurality of types (e.g., a smart phone type A, a smart phone type B, a smart TV type A, a smart TV type B, etc.), respectively, with regard to a specific device, and previously storing them in a rendering object region (refer to "121" of FIG. 5) as the plurality of object images which are virtualized. Here, the plurality of types may include versions of the firmware or the like.

Figure 5:
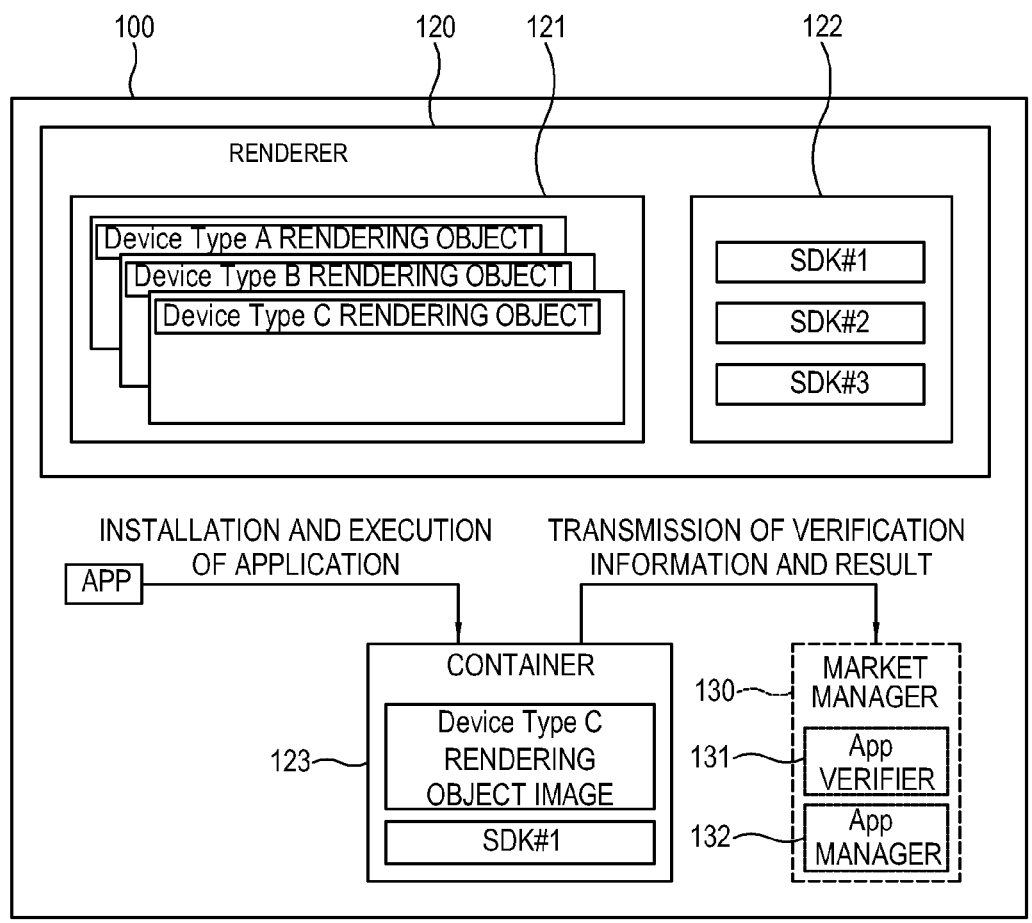
FIG. 5 is a view for explaining a procedure of a rendering a server for providing a cloud service in FIG. 1.

FIG. 5 is a view for explaining a procedure of rendering a server for providing a cloud service in FIG. 1.

The renderer 120 uses the rendered object image to construct the driving environment where the application is driven. In detail, as shown in FIG. 5, the renderer 120 selects one among the plurality of object images rendered and previously stored corresponding to the driving environment of the application, and loads the selected object image to the container 123, thereby constructing the driving environment of the application.

The renderer 120 may further load one selected among the plurality of software development kit (SDK) compatible with the device to the container 123. To this end, the plurality of SDKs compatible with the device, i.e., a specific smart phone or smart TV may be previously stored in a SDK region 122.

In this exemplary embodiment, the SDK may be provided as a plug-in of the integrated system of the cloud server 100.

The renderer 120 installs and executes the created application in the container 123 loaded with the rendering object image and the SDK, thereby verifying the application functionality.

According to an exemplary embodiment, the container 123 is used to exactly realize the driving environment where the practical application operates, and verify the application, thereby improving reliability of a result from the verification as compared with that using the emulator of the conventional terminal for the developer. That is, because the verification using the emulator installed in the terminal 300 for the developer depends on the environment of the terminal 300 for the developer, it is difficult to exactly realize the smart device where the practical application is installed and executed. On the other hand, the verification system according to an exemplary embodiment is independent on the terminal 300 for the developer, and therefore the application is verified in the driving environment for the practical application.

Here, the verification performed in the renderer 120 is the primary verification, which is distinct from the secondary verification performed in the verifier. The verification information loaded in the container 123 and the result of the primary verification performed in the renderer 120 are transmitted to the market manager 130. Here, the market manager 130 may transmit the result of the primary verification to the terminal 400 for the verifier. The verifier checks the result of the primary verification and then performs the secondary verification with regard to the application, thereby reducing the load of the verifier during the secondary verification procedure.

The market manager 130 may include an application verifier (hereinafter, referred to as an "App verifier") 131 for managing the result from verifying the application, and an application manager (hereinafter, referred to as an "App manager) 132 for managing the application of which verification is completed. Here, the App verifier 131 may manage both the primary verification result of the renderer 120 and the secondary verification result received from the terminal 400 for the verifier.

Meanwhile, if the verification result of the renderer 120 shows that there is a problem with the application, the cloud server 100 in this exemplary embodiment notifies the terminal 300 for the developer of this, and the developer modifies the created application by controlling the terminal 300 for the developer. Then, the renderer 120 re-verifies the completely-modified application through the rendering object image and the container 123 loaded with the SDK.

If there is no problem with the verification result of the App verifier 131, the App manager 132 uploads (or registers) the created application to a market 135 (see FIG. 3) and the application is published (or released). Here, the procedure of uploading and publishing the application with the market 135 may be controlled by the verifier. Specifically, the verifier controls the terminal 400 to release the completely verified application, and manage device information to which the application is applicable, firmware information, country, payment, etc.

Here, the App manager 132 may provide the operating systems, which continuously manages the application launched in the market 135, in the form of the templates. The provided operating systems are classified according to the developers and stored and managed in an operating system storage region 142 of the data storage 140, so that the developer can easily manage his/her own developed application through the template-type operating system.

The data storage 150 stores information without limitation. For example, the data storage 150 may store the setting information about the developing environment of FIG. 4, information about the servers constructed according to the developers, information about registered applications, an operating system for operating the cloud server 100, etc.

Meanwhile, although it is not shown, the cloud server 100 may further include an authenticator for authenticating the terminal 300 for the developer and the terminal 400 for the verifier. The authenticator authenticates a device trying to access the cloud server 100 by comparing terminal information received from the terminal 300 for the developer or the terminal 400 for the verifier, user information, etc. with authentication information stored in the data storage 150.

Figure 6:
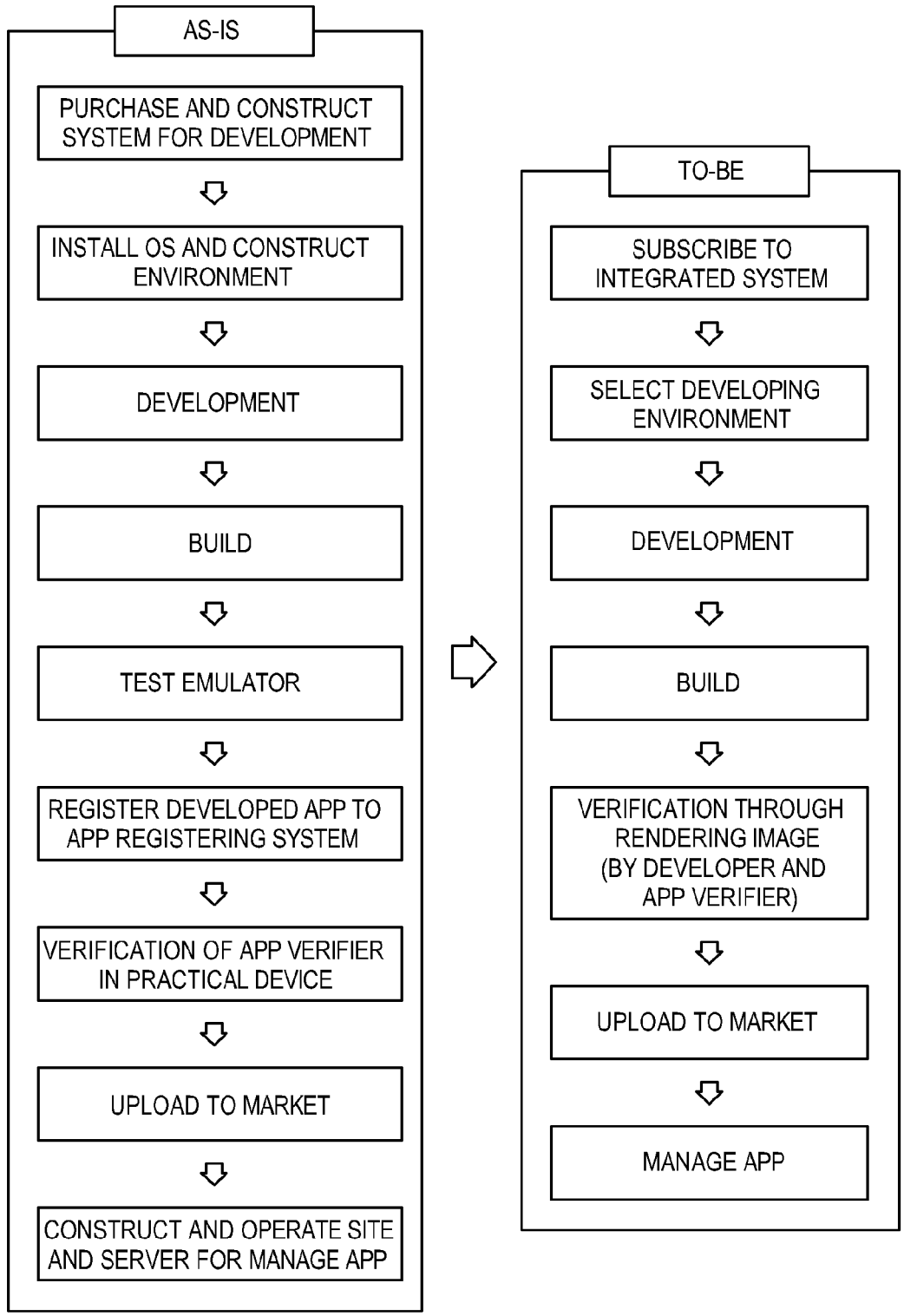
FIG. 6 is a view showing a comparison between a procedure of developing, releasing and managing an application according to an exemplary embodiment and a conventional procedure.

FIG. 6 is a view showing comparison between a procedure of developing, releasing and managing an application according to an exemplary embodiment and a conventional procedure.

As shown in FIG. 6, in a conventional case (AS-IS), the developer needs a procedure of purchasing a system for the application development, for example, the software development kit (SDK), the editor, the emulator and the compiler; a construction procedure of installing them in the terminal 300 for the developer; a procedure of installing an OS and constructing a developing environment, a procedure of testing the emulator; a procedure of registering an App; and a procedure of constructing and operating a site and the server for managing the completely developed App.

On the other hand, the present exemplary embodiment (TO-BE) has an advantage that simple procedures of subscribing to a cloud integrated system, selecting the developing environment through the templates, and performing verification through rendering are enough to develop, publish and manage the application.

Below, a method of creating the application using the cloud service according to an exemplary embodiment will be described with reference to FIG. 7.

Figure 7:
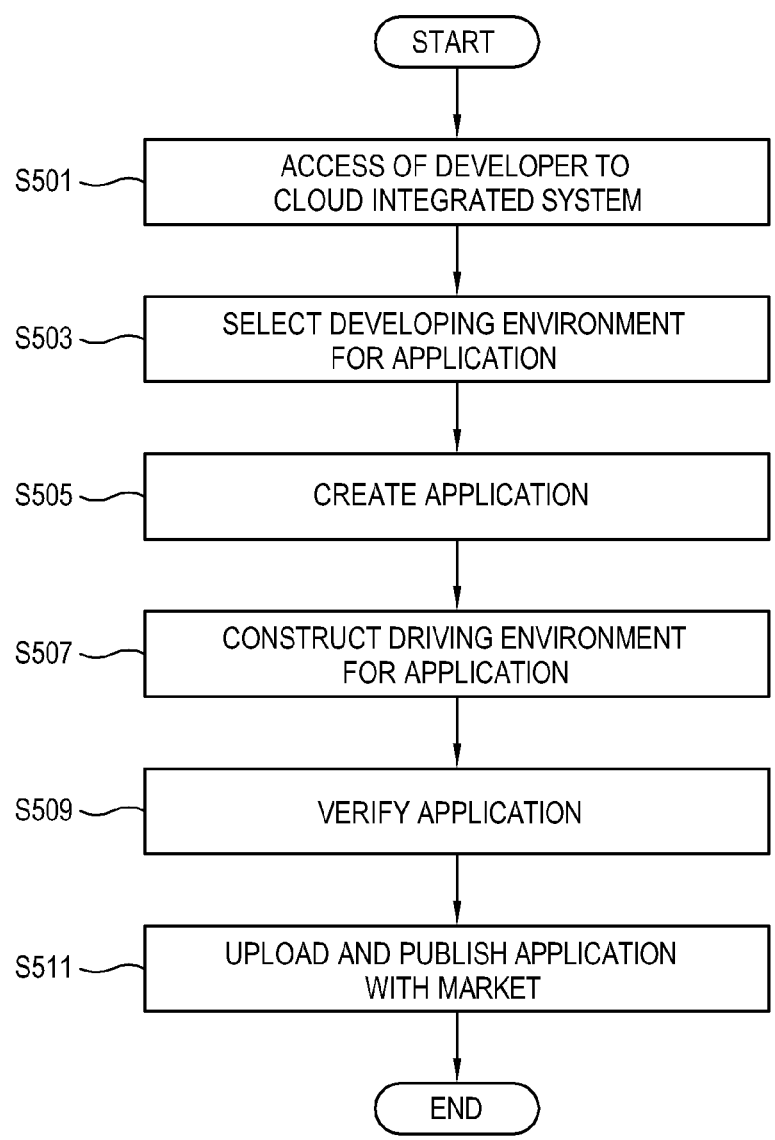
FIG. 7 is a flowchart showing a method of supporting application development according to an exemplary embodiment.

FIG. 7 is a flowchart showing a method of supporting application development according to an exemplary embodiment.

As shown in FIG. 7, the developer accesses the integrated system provided in the cloud server 100, using the terminal 300 for the developer (S501). Here, the plurality of templates previously stored corresponding to the application developing environment types are loaded and displayed on the display of the terminal 300 for the developer so as to be selected via a user interface.

The developer controls the terminal 300 for the developer to select the developing environment for the application by selecting one among the plurality of templates displayed in the operation S501 (S503). Here, if construction of a developing environment other than the previously stored templates is desired, the developer selects the software development kit (SDK), the editor, the compiler and the OS platform with regard to the development-target application, and then selects the developing environment for the application.

The cloud server 100 creates the application based on the developing environment selected in the operation S503 (S505). Then, the terminal 300 for the developer is notified of the result from creating the application.

The developer controls the terminal 300 for the developer to construct the driving environment for the application created in the operation S505 (S507). Here, a plurality of object images rendered and previously stored with regard to at least one device where the application is driven, and a plurality of SDKs compatible with the device are displayed as a user interface to be selectable on the display of the terminal 300 for the developer. Further, the developer controls the terminal 300 for the developer to select the rendered object image and the SDK. The cloud server 100 loads the selected object image and SDK to the container, and constructs the driving environment of the application.

The cloud server 100 verifies the application created in the operation S505 under the driving environment constructed in the operation S507 (S509). Here, the terminal 300 for the developer and the terminal 400 for the verifier are notified of the developer's primary verification result using the rendering object image, and the terminal 400 for the verifier further performs the secondary verification by making reference to the primary verification result.

If the verification is completed in the operation S509, the cloud server 100 uploads the corresponding application to the market 135 for publication (S511). Here, the cloud server 100 provides the templates through which the application is launched to the market 135 and can be managed, and the template for managing the application is loaded and displayed as a user interface on the display of the terminal 300 for the developer.

According to an exemplary embodiment, the cloud server 100 provides the developer with the cloud service for developing, publishing and managing the application, and thus the developer can easily construct the application developing environment without purchase and complicated installation procedures for constructing the integrated environment.

In particular, the developer can easily construct the developing environment by the simple control of selecting the previously stored templates, and the developer can select and construct various environments other than the stored temperate as desired.

Also, the rendered object image corresponding to the device where the application is driven is used to verify the application under a practical driving environment, thereby improving the reliability of the verification and reducing time and costs taken in the verification.

Also, the operating system for managing the uploaded and published application is provided in the form of a template, and it is thus convenient for the developer to manage the application.

Although a few exemplary embodiments have been shown and described, it will be appreciated by those skilled in the art that changes may be made in these exemplary embodiments without departing from the principles and spirit of the embodiments, the scope of which is defined in the appended claims and their equivalents.

Although a few embodiments have been shown and described, it would be appreciated by those skilled in the art that changes may be made in these embodiments without departing from the principles and spirit of the invention, the scope of which is defined in the claims and their equivalents.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the encoding apparatus and decoding apparatus described herein.

What is claimed is:

1. A method of supporting application development using a cloud service, the method comprising:
   accessing an integrated system providing a cloud service;
   selecting a developing environment corresponding to a development-target application through a template provided by the integrated system;
   creating a created application based on the developing environment;
   constructing a driving environment, in which the created application operates, using an object image provided by the integrated system, the object image being rendered with regard to at least one device where the created application is driven;
   verifying the created application through the object image to determine the created application is properly operated in the constructed driving environment;
   transmitting a result of the verifying to a verifier;
   uploading and publishing the created application to a market in accordance with results of the verifying; and
   providing an operating system, which manages a registered application in a form of the template.

2. The method according to claim 1, wherein the selecting the developing environment comprises:

loading a plurality of templates previously stored corresponding to types of the developing environment for the application; and selecting one among the plurality of templates by a user.

3. The method according to claim 1, wherein the selecting the developing environment comprises selecting a software development kit (SDK), an editor, a compiler and an operating system (OS) platform with regard to the development-target application.

4. The method according to claim 1, wherein the constructing the driving environment comprises:

selecting one among a plurality of object images rendered as a selected object image and previously stored corresponding to an application driving environment of the created application; and loading a container with the selected object image.

5. The method according to claim 4, wherein a plurality of objects are rendered corresponding to each of a plurality of types of the device and previously stored as the plurality of object images which are virtualized.

6. The method according to claim 1, wherein the constructing the driving environment comprises:

selecting one among a plurality of software development kits compatible with the device; and loading a container with the selected software development kit.

7. The method according to claim 6, wherein the one among the plurality of software development kits is provided as a plug-in of the integrated system.

8. The method according to claim 1, further comprising re-verifying the application using a object image rendered in accordance with results of the verifying.

9. A server for providing a cloud service, which a terminal for a developer of an application accesses, the server comprising:

a template provider configured to provide a plurality of templates corresponding to a developing environment for a development-target application so that the terminal for the developer can select a template; and a renderer configured to construct a driving environment, in which a created application operates, using an object image rendered with regard to at least one device where the created application is to be driven, and to verify the created application created based on the developing environment corresponding to the template selected among the plurality of templates, through the object image to determine the created application is properly operated in the constructed driving environment, the template provider and the renderer being included in an integrated system of the server for providing the cloud service, the renderer transmitting a result of the verifying to a verifier, uploading and publishing the created application to a market in accordance with results of the verifying, and providing an operating system, which manages a registered application in a form of the template.

10. The server according to claim 9, wherein the template provider loads the plurality of templates previously stored corresponding to types of developing environment for the created application, and receives selection from the terminal for the developer about one among the plurality of templates.

11. The server according to claim 9, further comprising a developing environment setter configured to provide a software development kit (SDK), an editor, a compiler and an operating system (OS) platform to be selected with regard to the development-target application.

12. The server according to claim 9, wherein the renderer loads a container with one object image selected among a plurality of object images rendered and previously stored corresponding to the driving environment for the created application.

13. The server according to claim 12, wherein a plurality of objects are rendered corresponding to each of a plurality of types of the device and previously stored as the plurality of object images which are virtualized.

14. The server according to claim 9, wherein the renderer further loads a container with one software development kit selected among a plurality of software development kits compatible with the device.

15. The server according to claim 14, wherein the one software development kit is provided as a plug-in of an integrated system.

16. The server according to claim 9, wherein the renderer re-verifies the created application using the object image rendered in accordance with results of the verify.

17. A terminal for a developer, which accesses a server for providing a cloud service, the terminal comprising:

a display configured to display a plurality of templates corresponding to a developing environment of a development-target application and display an object image rendered with regard to at least one device where the application is driven so that a template and the object image received from the server for providing the cloud service can be selected; and a user input section configured to select the developing environment for the application by selecting one among the plurality of templates displayed to create a created application based on the developing environment, and select a driving environment of the application by selecting one among displayed object images to construct the driving environment, in which the created application operates and to verify the created application in the driving environment by determining the created application is properly operated in the constructed driving environment, and the developing environment and driving environment selected being transmitted to the server for providing the cloud service, the user input section transmitting a result of the verifying to a verifier, uploading and publishing the created application to a market in accordance with results of the verifying, and providing an operating system, which manages a registered application in a form of the template.

18. The terminal according to claim 17, wherein the user input section selects a software development kit (SDK), an editor, a compiler and an operating system (OS) platform with regard to the development-target application.

19. The terminal according to claim 17, wherein the user input section further selects one among a plurality of software development kits compatible with the device; and selects the driving environment of the application.

20. The terminal according to claim 17, wherein the display further displays an operating system, which manages an application registered to the server for providing the cloud service, in a form of a template.

21. A smart device application development method, comprising:

selecting a developing environment using a template provided by an integrated system of a cloud service;

creating an application of a smart device using the developing environment;

rendering an object image using the application with respect to the device where the application is to be driven to construct a driving environment, in which the application operates and to verify the application by determining the application is properly operated in the constructed driving environment, accessing an integrated system providing a cloud service;

selecting a developing environment corresponding to a development-target application through a template provided by the integrated system;

creating a created application based on the developing environment;

constructing a driving environment, in which the created application operates, using an object image provided by the integrated system, the object image being rendered with regard to at least one device where the created application is driven;

verifying the created application through the object image to determine the created application is properly operated in the constructed driving environment;

transmitting a result of the verifying to a verifier;

uploading and publishing the created application to a market in accordance with results of the verifying; and providing an operating system, which manages a registered application in a form of the template.

22. A method, comprising:

creating an application for a target smart device;

rendering an object image using the application with respect to the target smart device where the application is to be driven to construct a driving environment, in which the application operates;

visually verifying the application using the object image, so that the rendering the object image facilitates verification to determine the application is properly operated in the constructed driving environment, accessing an integrated system providing a cloud service;

selecting a developing environment corresponding to a development-target application through a template provided by the integrated system;

creating a created application based on the developing environment;

constructing a driving environment, in which the created application operates, using an object image provided by the integrated system, the object image being rendered with regard to at least one device where the created application is driven;

verifying the created application through the object image to determine the created application is properly operated in the constructed driving environment;

transmitting a result of the verifying to a verifier;

uploading and publishing the created application to a market in accordance with results of the verifying; and providing an operating system, which manages a registered application in a form of the template.

\* \* \* \* \*